Aug. 20, 1929. P. K. SAUNDERS 1,725,676

PISTON FOR USE IN INTERNAL COMBUSTION ENGINES

Filed Nov. 2, 1928

Fig. 8. Inventor
P. K. Saunders.
By Watson E. Coleman atty

Patented Aug. 20, 1929.

1,725,676

UNITED STATES PATENT OFFICE.

PHILIP KEITH SAUNDERS, OF JOHANNESBURG, SOUTH AFRICA.

PISTON FOR USE IN INTERNAL-COMBUSTION ENGINES.

Application filed November 2, 1928, Serial No. 316,761, and in Great Britain October 11, 1928.

This invention is an improvement in or modification of the bimetallic piston disclosed in the specification accompanying my application filed 7th October, 1926, under Serial Number 140,019, now Patent Number 1,696,017 comprising a head of aluminium or other light metal of high heat conductivity with depending lugs containing gudgeon pin bearings and a skirt of some harder wearing metal attached at diametrically opposed points to the lugs of the piston head.

The primary object of the present invention is to provide a stronger and more secure connection between the piston head and the skirt, whilst still allowing for relative expansion of the parts. A further object of the present invention is to provide an improved skirt for a bimetallic piston which shall lend itself to production by stamping from sheet metal. A still further object of this invention is to provide an improved form of skirt and manner of connection with the piston head which shall be better adapted for transmitting to the cylinder walls the lateral thrusts set up due to the angularity of the connecting rod. It is also an object of my invention to provide in a bimetallic piston means whereby the gudgeon pin may be removed without detaching the skirt.

With these and other objects in view, the present invention consists in utilizing a skirt composed of two parts each flanged along its longitudinal edges and in securing said flanges in slots cut diametrically of the piston in the piston head lugs. The connection between these parts is preferably made permanent and secure by riveting the bifurcated lugs with the skirt flanges between them. The skirt parts which are identical in form are pressed from sheet metal and stiffened by channel shaped depressions formed circumferentially across the cylindrical face thereof, or by flanges pressed on their ends.

The invention may be better understood by reference to the accompanying drawing wherein:—

Fig. 8 shows a modified arrangement of the gudgeon pin bearing.

Figure 1:
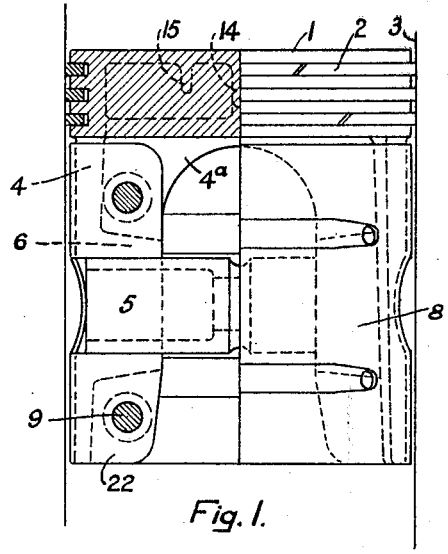
Fig. 1 is a front elevation partly in section of an improved bimetallic piston constructed in accordance with my invention.

Referring to these drawings it will be seen that the improved bimetallic piston comprises a hollow head 1 of aluminium or other light and highly conductive metal fitted exteriorly with piston rings 2, the external diameter of the head being normally substantially less than the diameter of the cylinder 3 to allow liberty for expansion under the high temperatures prevailing in the cylinder. Cast integral with the head 1 are two tapered depending lugs 4 substantially T-shaped in section, the central web of the two lugs being united adjacent the head by an arch shaped stiffening and cooling web 4ª extending diametrically across the piston head. Other webs 14 and 15 at right angles or parallel to the web 4ª also assist in stiffening the lugs 4 and cooling the piston head 1. Alternatively ribs radiating from the centre of the piston head may be provided for the same purpose. The lugs 4 which are formed with bosses 6 for the reception of the gudgeon pin 5 are slotted at 7 diametrically of the piston from their lower ends up to the level of the lower edge of the head 1 to afford a means of secure connection for the skirt 8.

The skirt 8 is composed of two substantially semi-cylindrical sheet metal pressings, each having at their longitudinal edges flattened inturned flanges 22, adapted when when placed together to fit snugly in the slots 7 in the lugs 4 of the piston head. When the skirt parts are so engaged with the piston head the connection is made secure by rivets 9 pasisng through the flanges 22 and the two parts of the lugs 4 at points above and below the gudgeon pin bosses 6, the rivets being closed by hydraulic or other convenient riveting tools. The skirt parts and their flanges 22 are cut away as at 13 to clear the gudgeon pin 5.

Figure 6:
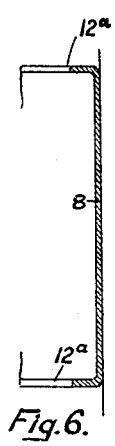
Figure 7:
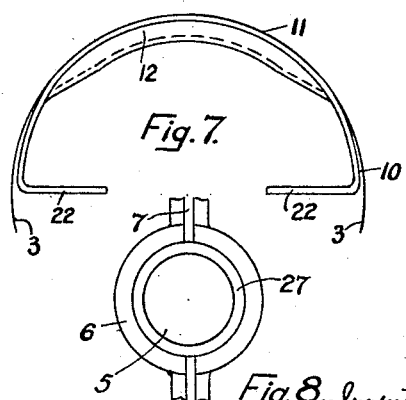

The parts of the skirt are so fashioned that the side parts 10 adjacent the ends of the gudgeon pin 5 normally just clear the cylinder wall 3 whilst the parts 11 at right angles thereto make close contact therewith. The parts 11 of the skirt engaging the cylinder wall 3 closely are preferably reinforced as by the circumferential channel shaped depressions 12, or by the end flanges 12ᵃ shown in Fig. 6, in order that they may remain truly cylindrical at all times in spite of the tendency to distortion, arising from the expansion of the piston head. The lateral portions 10 of the skirt parts are however, left unstiffened in order that they may yield to the expansion of the piston head without imposing undue stress on the reinforced parts 11. The arched form of the skirt part enables it to withstand the slipper thrusts without suffering deformation, and the wide flanges 22 disposed diametrically of the piston being adequately suported between the parts of the lugs 4 are well adapted for transmitting such forces to the piston head and gudgeon pin.

Figure 2:
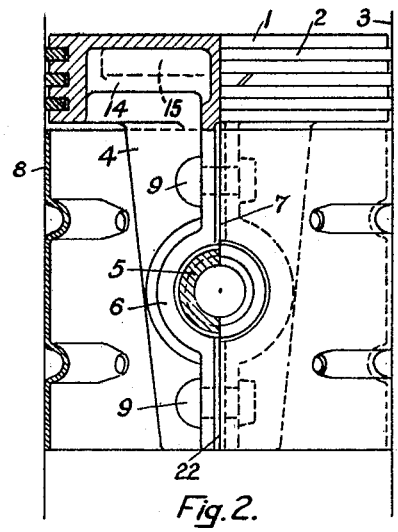
Fig. 2 is a side elevation partly in section of the same.
Figure 3:
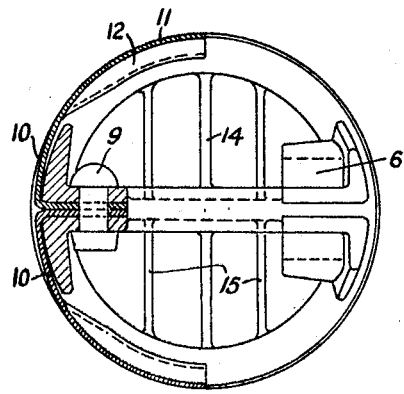
Fig. 3 is an inverted plan partly in section, the piston skirt being omitted from the right hand half of the figure.
Figure 4:
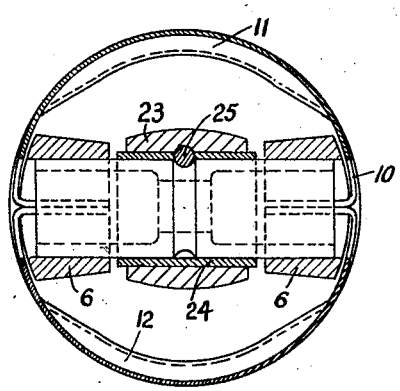
Fig. 4 is a sectional plan showing the gudgeon pin bearings.
Figure 5:
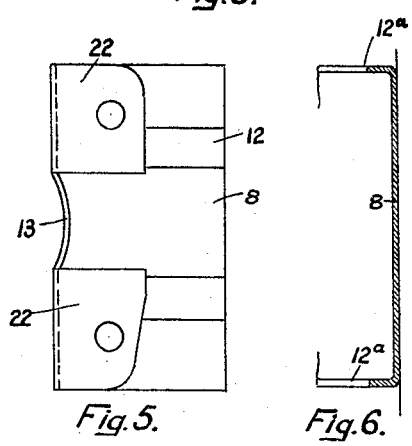
Figs. 5, 6 and 7 are detail views showing one half of the piston skirt.

As shown in Fig. 4 the connecting rod 23 with its small end bush 24 may be secured to the gudgeon pin 5 by a cotter pin 25 engaged with a peripheral groove in the gudgeon pin. The gudgeon pin 5 may be engaged with the bosses 6 directly as shown in Figs. 2 and 4 or if preferred, with bushes 27 mounted in said bosses, see Fig. 8.

I claim:

1. A bimetallic piston comprising a head of light metal with depending lugs adapted to receive a gudgeon pin, a skirt composed of two substantially semi-cylindrical halves of wear resisting metal each having at its longitudinal edges inturned flanges engaged in slots in the depending lugs.

2. A bimetallic piston comprising a head of light metal of high conductivity with depending lugs of substantially T-shaped section, a gudgeon pin engaged in said lugs, a two part skirt of a hard wear resisting material, and flanges on the parts of the skirt engaged in slots in said depending lugs.

3. A bimetallic piston comprising a head of light metal of high conductivity with depending lugs of substantially T-shaped section, a gudgeon pin engaged in said lugs, a two part skirt of a hard wear resisting material, flanges on the parts of the skirt engaged in slots in said depending lugs and rivets securely connecting said flanges with said lugs.

4. A bimetallic piston comprising a head of aluminium with depending lugs supporting a gudgeon pin, a skirt composed of two substantially semi-cylindrical sheet metal pressings with inturned flanges at their longitudinal edges and slots in the lugs in which said flanges are united and secured by rivets.

5. A bimetallic piston comprising an aluminium head, depending lugs integral with said head, gudgeon pin bearings in said lugs, two substantially semi-cylindrical skirt parts pressed from sheet metal, means stiffening the skirt parts circumferentially in part and means securing the unstiffened portions of the skirt parts to the lugs.

6. A bimetallic piston according to claim 5, wherein the stiffened portions of the skirt parts are adapted to contact constantly with the cylinder wall whilst the unstiffened portions are normally clear thereof.

7. A bimetallic piston comprising a hollow aluminium head, cooling and stiffening ribs cast within said head, slotted lugs depending from said head, a skirt composed of two substantially semi-cylindrical parts having flanges secured in the slotted lugs, that part of the skirt acting as slipper constituting an arch in compression.

8. A bimetallic piston comprising a head of aluminium, depending lugs cast integral therewith, gudgeon pin bearings in said lugs, a two part skirt having flanges secured in slots in the lugs, and apertures in the skirt parts aligned with the gudgeon pin bearings to permit the insertion and removal of the gudgeon pin without disturbing the skirt.

In testimony whereof he has affixed his signature.

PHILIP KEITH SAUNDERS.